United States Patent
Honjo et al.

(10) Patent No.: US 6,701,407 B1
(45) Date of Patent: Mar. 2, 2004

(54) MULTIPROCESSOR SYSTEM WITH SYSTEM MODULES EACH HAVING PROCESSORS, AND A DATA TRANSFER METHOD THEREFOR

(75) Inventors: Yasumasa Honjo, Kawasaki (JP); Toru Watabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 368 days.

(21) Appl. No.: 09/715,196

(22) Filed: Nov. 20, 2000

(30) Foreign Application Priority Data

Dec. 13, 1999  (JP) .......................................... 11-353730
Dec. 13, 1999  (JP) .......................................... 11-353731

(51) Int. Cl.[7] ............................................. G06F 13/00
(52) U.S. Cl. ....................................... 710/317; 710/316
(58) Field of Search ................................. 710/317, 316

(56) References Cited

U.S. PATENT DOCUMENTS

| 5,519,704 A | * | 5/1996 | Farinacci et al. | 370/402 |
|---|---|---|---|---|
| 5,832,303 A | * | 11/1998 | Murase et al. | 710/36 |
| 5,857,111 A | * | 1/1999 | Oda | 712/11 |
| 5,896,516 A | * | 4/1999 | Powell, Jr. et al. | 710/317 |
| 6,023,471 A | * | 2/2000 | Haddock et al. | 370/426 |
| 6,125,429 A | * | 9/2000 | Goodwin et al. | 711/143 |
| 6,212,612 B1 | * | 4/2001 | Turner | 711/170 |
| 6,282,583 B1 | * | 8/2001 | Pincus et al. | 709/400 |
| 6,480,941 B1 | * | 11/2002 | Franke et al. | 711/153 |
| 6,587,468 B1 | * | 7/2003 | Dos Santos et al. | 370/401 |
| 6,643,286 B1 | * | 11/2003 | Kapadia et al. | 370/389 |

FOREIGN PATENT DOCUMENTS

| JP | 62-154158 | 7/1987 |
|---|---|---|
| JP | 7-319823 | 12/1995 |

* cited by examiner

*Primary Examiner*—Khanh Dang
*Assistant Examiner*—Kim T. Huynh
(74) *Attorney, Agent, or Firm*—Staas & Halsey LLP

(57) ABSTRACT

A multiprocessor system includes a plurality of system modules each having a plurality of processors, a transfer controller and a first crossbar, a crossbar module including a second crossbar, a control bus coupling the transfer controller of each of the system modules to the crossbar module, and a data bus coupling the first crossbar of each of the system modules to the crossbar module. Within an arbitrary one of the system modules, the first crossbar outputs a data packet to the data bus in response to a command signal from the transfer controller after the transfer controller outputs a control information packet to the control bus.

4 Claims, 17 Drawing Sheets

FIG. 5

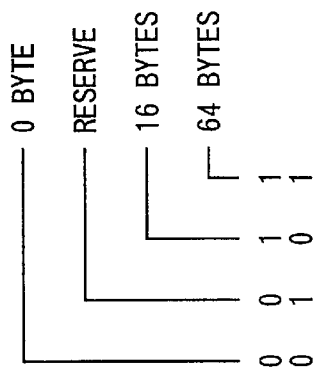

| BIT | 1τ | 2τ |
|---|---|---|
| 19 | ODD PARITY [18~10] | ODD PARITY [18~10] |
| 18 | NODEID#1 | (RESERVE) |
| 17 | NODEID#0 | REPLY TYPE-1 |
| 16 | SLOTID#2 | REPLY TYPE-2#3 |
| 15 | SLOTID#1 | REPLY TYPE-2#2 |
| 14 | SLOTID#0 | REPLY TYPE-2#1 |
| 13 | (RESERVE) | REPLY TYPE-2#0 |
| 12 | BUFFER TYPE | MASTERSB CID#2 |
| 11 | PORTID#3 | MASTERSB CID#1 |
| 10 | PORTID#2 | MASTERSB CID#0 |
| 09 | ODD PARITY [08~00] | ODD PARITY [08~00] |
| 08 | NODEID#1 | MASTERSB NODEID#1 |
| 07 | NODEID#0 | MASTERSB NODEID#0 |
| 06 | SLOTID#2 | MASTERSB SLOTID#2 |
| 05 | SLOTID#1 | MASTERSB SLOTID#1 |
| 04 | SLOTID#0 | MASTERSB SLOTID#0 |
| 03 | DATA TRANSFER QUANTITY#1 | MASTERSB PORTID#2 |
| 02 | DATA TRANSFER QUANTITY#0 | MASTERSB PORTID#1 |
| 01 | PORTID#1 | MASTERSB PORTID#0 |
| 00 | PORTID#0 | |

DATA TRANSFER QUANTITY#1 = 0, 0, 1, 1
DATA TRANSFER QUANTITY#0 = 0, 1, 0, 1
→ 0 BYTE, RESERVE, 16 BYTES, 64 BYTES

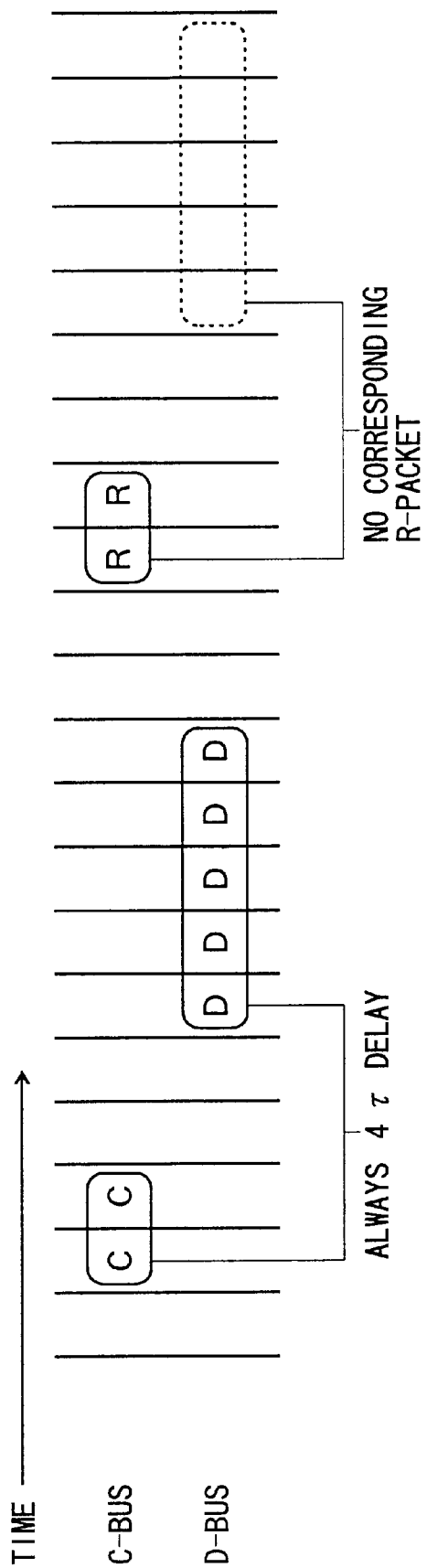

MULTIPROCESSOR SYSTEM WITH SYSTEM MODULES EACH HAVING PROCESSORS, AND A DATA TRANSFER METHOD THEREFOR

BACKGROUND OF THE INVENTION

This application claims the benefit of Japanese Patent Applications No. 11-353730 filed Dec. 13, 1999 and No. 11-353731 filed Dec. 13, 1999, in the Japanese Patent Office, the disclosures of which are hereby incorporated by reference.

1. Field of the Invention

The present invention generally relates to multiprocessor systems and data transfer methods, and more particularly to a multiprocessor system in which a plurality of system modules each having a plurality of processors are connected, and to a data transfer method which is employed in such a multiprocessor system.

2. Description of the Related Art

In the conventional multiprocessor system, a plurality of processors are connected via a bus. However, as the number of processor becomes large and the scale of the multiprocessor system becomes large, contentions are frequently generated on the bus. For this reason, it is becoming more difficult to carry out the data transfer at a high speed with a high efficiency.

Accordingly, when the number of processors becomes extremely large in the conventional multiprocessor system, it is desired to carry out the data transfer at a high speed with a high efficiency. Consequently, although the number of processors is originally increased in order to improve the performance of the multiprocessor system, it is also desired to greatly improve the performance from the point of view of the data transfer among the processors.

SUMMARY OF THE INVENTION

Accordingly, it is a general object of the present invention to provide a novel and useful multiprocessor system and data transfer method, in which the problems described above are eliminated.

Another and more specific object of the present invention is to provide a multiprocessor system and a data transfer method, which can carry out a data transfer at a high speed with a high efficiency, even if the number of processors becomes large and the scale of the multiprocessor system becomes large.

Still another object of the present invention is to provide a multiprocessor system comprising a plurality of system modules each having a plurality of processors, a transfer controller and a first crossbar, a crossbar module including a second crossbar, a control bus coupling the transfer controller of each of the system modules to the crossbar module, and a data bus coupling the first crossbar of each of the system modules to the crossbar module, wherein, within an arbitrary one of the system modules, the first crossbar outputs a data packet to the data bus in response to a command signal from the transfer controller after the transfer controller outputs a control information packet to the control bus. According to the multiprocessor system of the present invention, it is possible to carry out a data transfer at a high speed with a high efficiency, even if the number of processors becomes large and the scale of the multiprocessor system becomes large.

A further object of the present invention is to provide a data transfer method for a multiprocessor system in which a plurality of system modules each including a plurality of processors, a transfer controller and a first crossbar are coupled to a crossbar module including a second crossbar, via a control bus and a data bus, comprising the operation of, within an arbitrary one of the system modules, outputting a data packet to the data bus from the first crossbar in response to a command signal from the transfer controller after the transfer controller outputs a control information packet to the control bus. According to the data transfer method of the present invention, it is possible to carry out a data transfer at a high speed with a high efficiency, even if the number of processors becomes large and the scale of the multiprocessor system becomes large.

Another object of the present invention is to provide a multiprocessor system comprising a plurality of system modules each including a plurality of processors, a transfer controller and a first crossbar, and a crossbar module including a second crossbar which couples the plurality of system modules, wherein, when making a transfer within an arbitrary one of the plurality of system modules, the transfer controller transfers a control information packet therewithin without passing the second crossbar. According to the multiprocessor system of the present invention, it is possible to carry out a data transfer at a high speed with a high efficiency, even if the number of processors becomes large and the scale of the multiprocessor system becomes large.

Still another object of the present invention is to provide a data transfer method for a multiprocessor system in which a plurality of system modules each including a plurality of processors, a transfer controller and a first crossbar are coupled to a crossbar module including a second crossbar, comprising the operation of, within an arbitrary one of the system modules, transferring a control information packet and a data packet within the arbitrary system module without passing the second crossbar. According to the data transfer method of the present invention, it is possible to carry out a data transfer at a high speed with a high efficiency, even if the number of processors becomes large and the scale of the multiprocessor system becomes large.

Other objects and further features of the present invention will be apparent from the following detailed description when read in conjunction with the accompanying drawings.

BRIEF DESCRIPTION OF THE DRAWINGS

FIG. 5 is a diagram showing the bit structure of a C-packet;

FIG. 6 is a diagram showing a C-packet and a R-packet transferred on a C-bus and a D-packet transferred on a D-bus;

Figure 12:
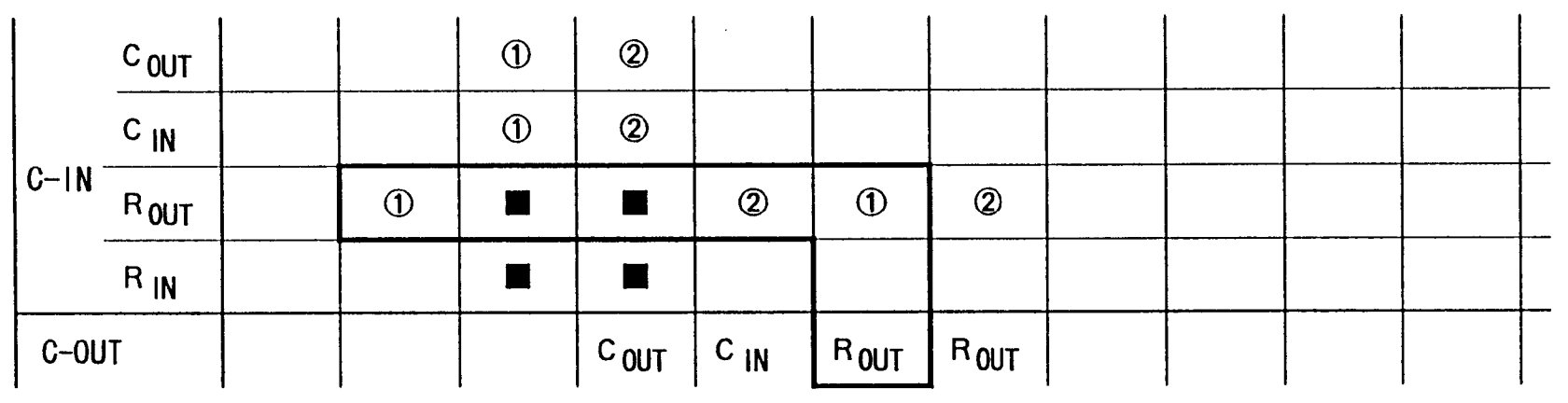

FIG. 12 is a diagram for explaining the operation of the data buffer section of the second embodiment;

Figure 13:
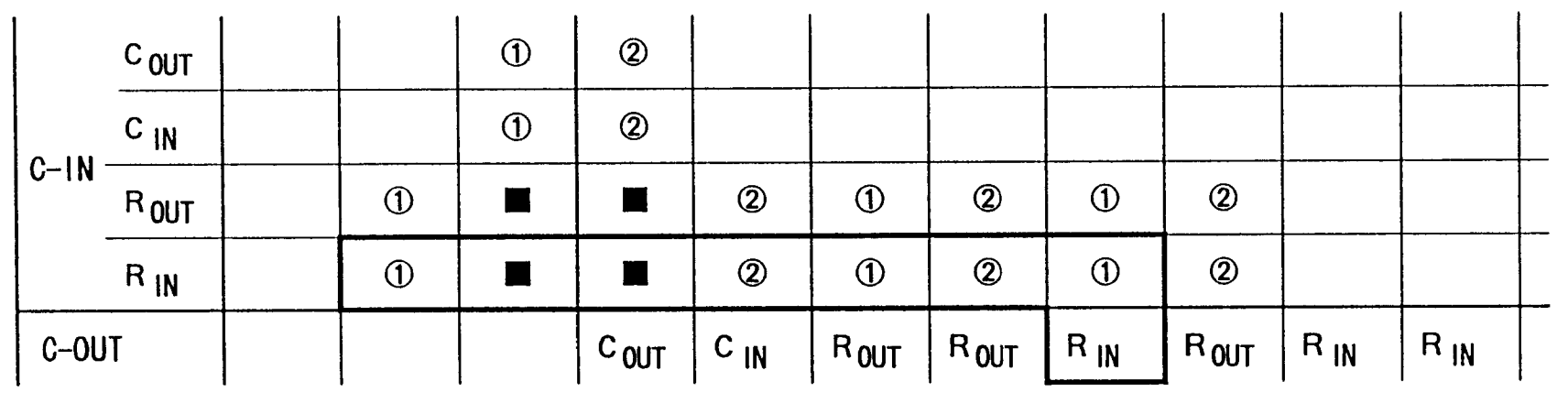

FIG. 13 is a diagram for explaining the operation of the data buffer section of the second embodiment;

DESCRIPTION OF THE PREFERRED EMBODIMENTS

Various embodiments of a multiprocessor system according to the present invention and a data transfer method according to the present invention will be described with reference to the drawings.

Figure 1:
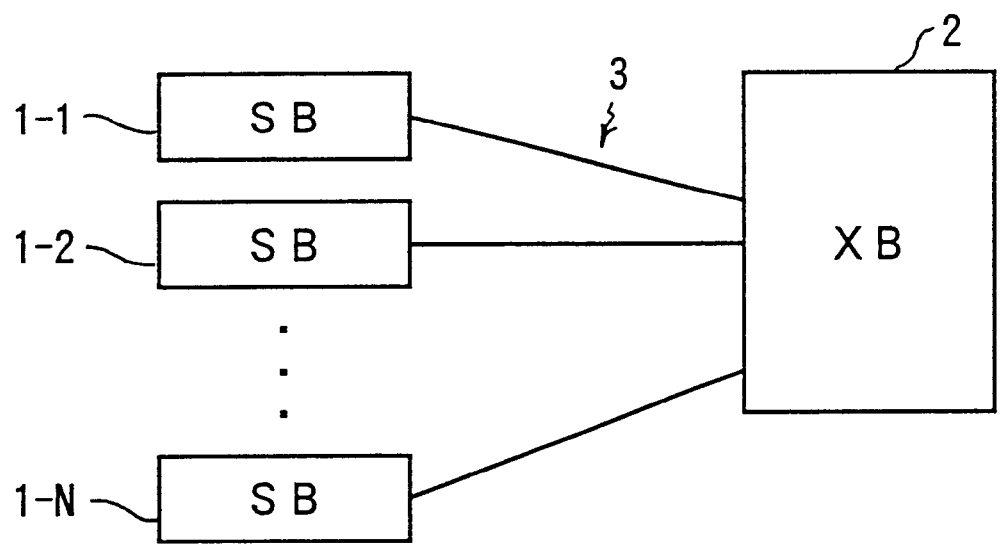
FIG. 1 is a system block diagram showing the general construction of a first embodiment of a multiprocessor system according to the present invention.

FIG. 1 is a system block diagram showing the general construction of a first embodiment of the multiprocessor system according to the present invention. This first embodiment of the multiprocessor system employs a first embodiment of the data transfer method according to the present invention.

The multiprocessor system shown in FIG. 1 generally includes a plurality of system modules (or system boards, SBs) 1-1 through 1-N, a crossbar module (or crossbar board, XB) 2, and a bus 3 which connects the system modules 1-1 through 1-N and the crossbar module 2. Each of the system modules 1-1 through 1-N have the same construction.

Figure 2:
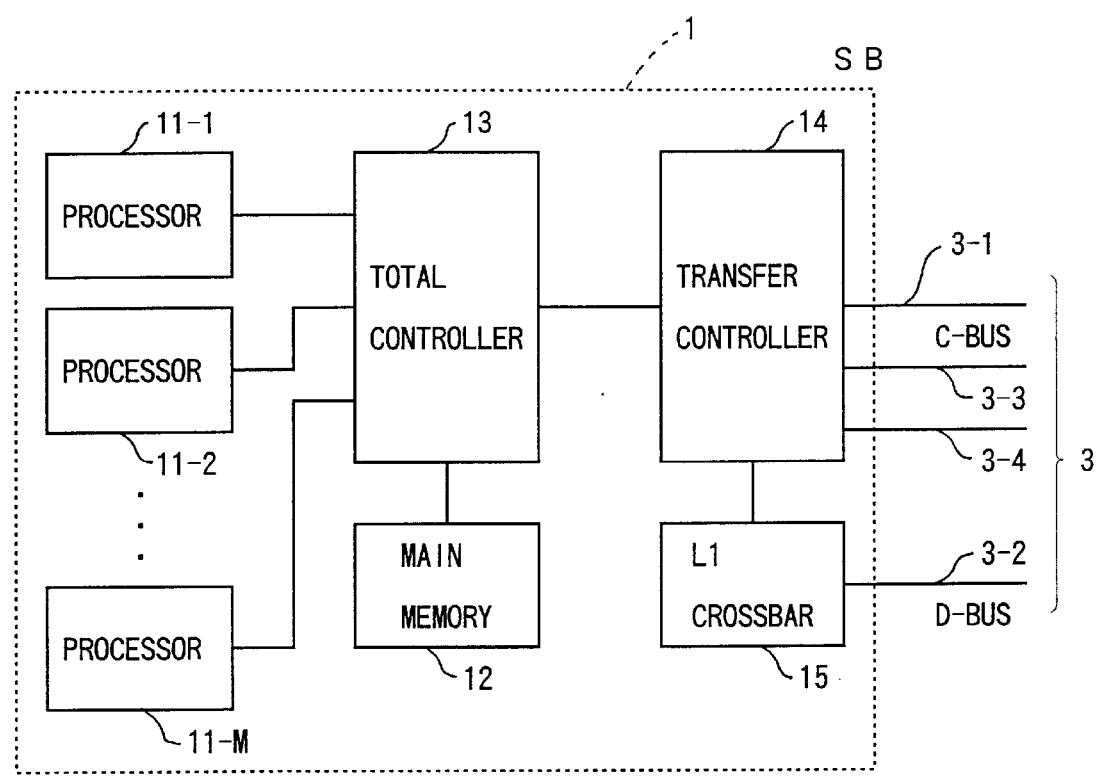
FIG. 2 is a system block diagram showing the construction of a system module of the first embodiment.

FIG. 2 is a system block diagram showing the construction of one system module 1. The system module 1 shown in FIG. 2 includes a plurality of processors 11-1 through 11-M each having a CPU or the like and a cache memory, a main memory 12, a total controller 13 which controls access to the main memory 12 and the like, a transfer controller 14, and a level-1 (L1) crossbar 15. The transfer controller 14 is connected to a control bus (hereinafter simply referred to as a C-bus) 3-1, an address bus 3-3 and a status bus 3-4 which form a bus 3. The L1 crossbar 15 is connected to a data bus (hereinafter simply referred to as a D-bus) 3-2 which forms the bus 3.

Figure 3:
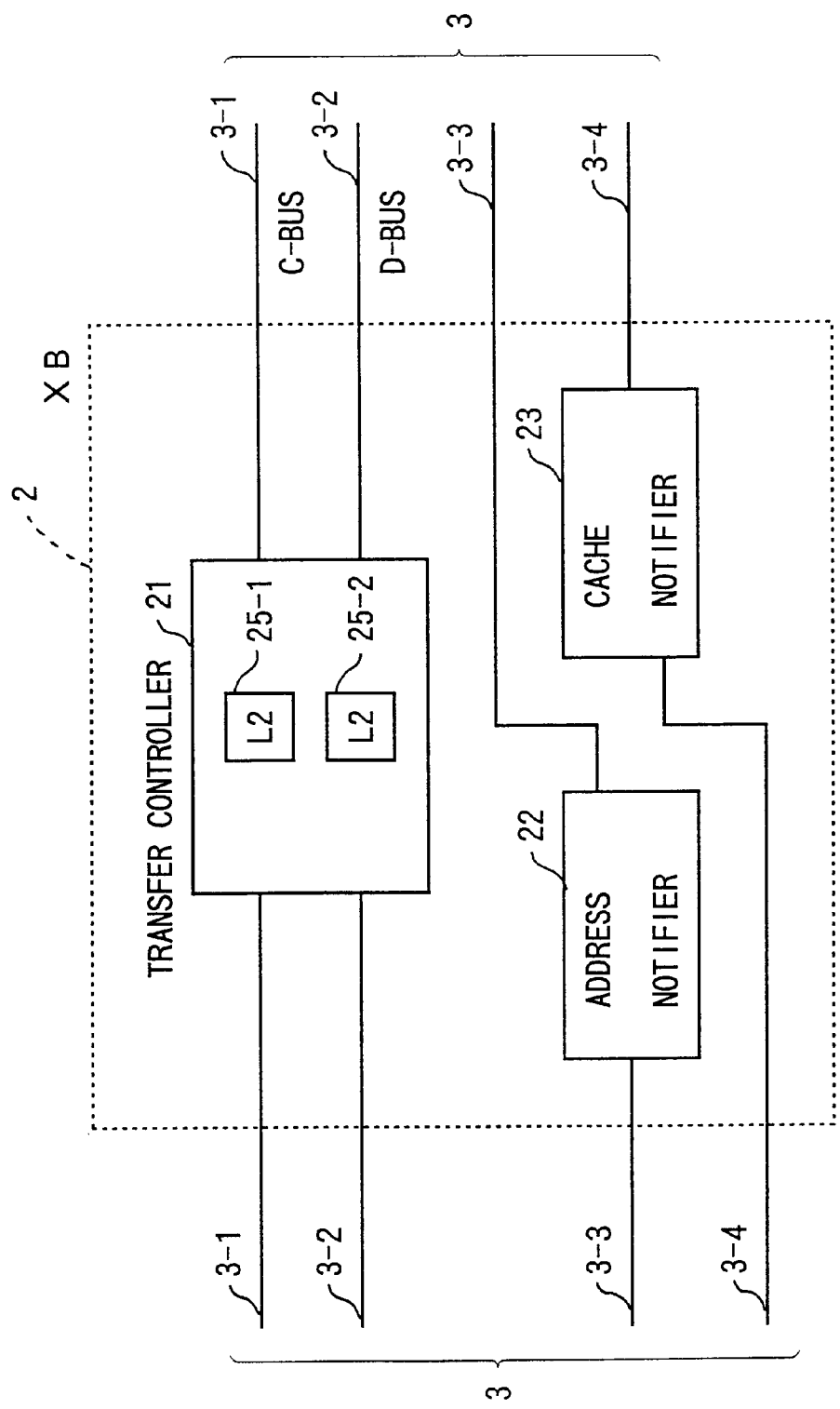
FIG. 3 is a system block diagram showing the construction of a crossbar module of the first embodiment.

FIG. 3 is a system block diagram showing the construction of the crossbar module 2. The crossbar module 2 shown in FIG. 3 includes a transfer controller 21, an address notifier 22, and a cache notifier 23. For the sake of convenience, FIG. 3 shows a case where the crossbar module 2 connects between the system modules 1-1 and 1-2 shown in FIG. 1. As will be described later, the transfer controller 21 includes a level-2 (L2) crossbar 25-1 which is connected to the C-bus 3-1, and a L2 crossbar 25-2 which is connected to the D-bus 3-2.

First, a description will be given of the procedure of a read process which is one of the normal transfer processes. For example, a read request which is issued from the system module 1-1 is supplied to each of the system modules 1-2 through 1-N by the crossbar module 2 via the address bus 3-3 of the bus 3. The crossbar module 2 notifies a requested address of the read request to each of the system modules 1-2 through 1-N from the address notifier 22 via the address bus 3-3 of the bus 3. Each of the system modules 1-1 through 1-N supplies cache information (status information) which indicates states of the cache memories of the processors 11-1 through 11-M to the crossbar module 2 via the status bus 3-4 of the bus 3. The crossbar module 2 notifies merged cache information to each of the system modules 1-1 through 1-N from the cache notifier 23 via the status bus 3-4 of the bus 3. Accordingly, if a system module which has a memory with the requested address and holding valid data within the memory exists among the system modules 12 through 1-N, the valid data is read and output with respect to the crossbar module 2 via the transfer controller 14 and the L1 crossbar 15. The valid data which is output in this manner is further transferred to the system module 1-1 at the request source via the transfer controller 21 of the crossbar module 2. In a case where the system module 1-1 at the request source has the memory with the requested address, the data transfer is made within the system module 1-1 with respect to the processor at the request source.

This embodiment is particularly characterized by the data transfer within the system module or between the system modules, after the above described notification of the address and the notification of the cache information are made, that is, after preparations for the data transfer are completed. In the following description, the operation is described for the read process for the sake of convenience, but a similar data transfer is of course made for a write process.

Figure 4:
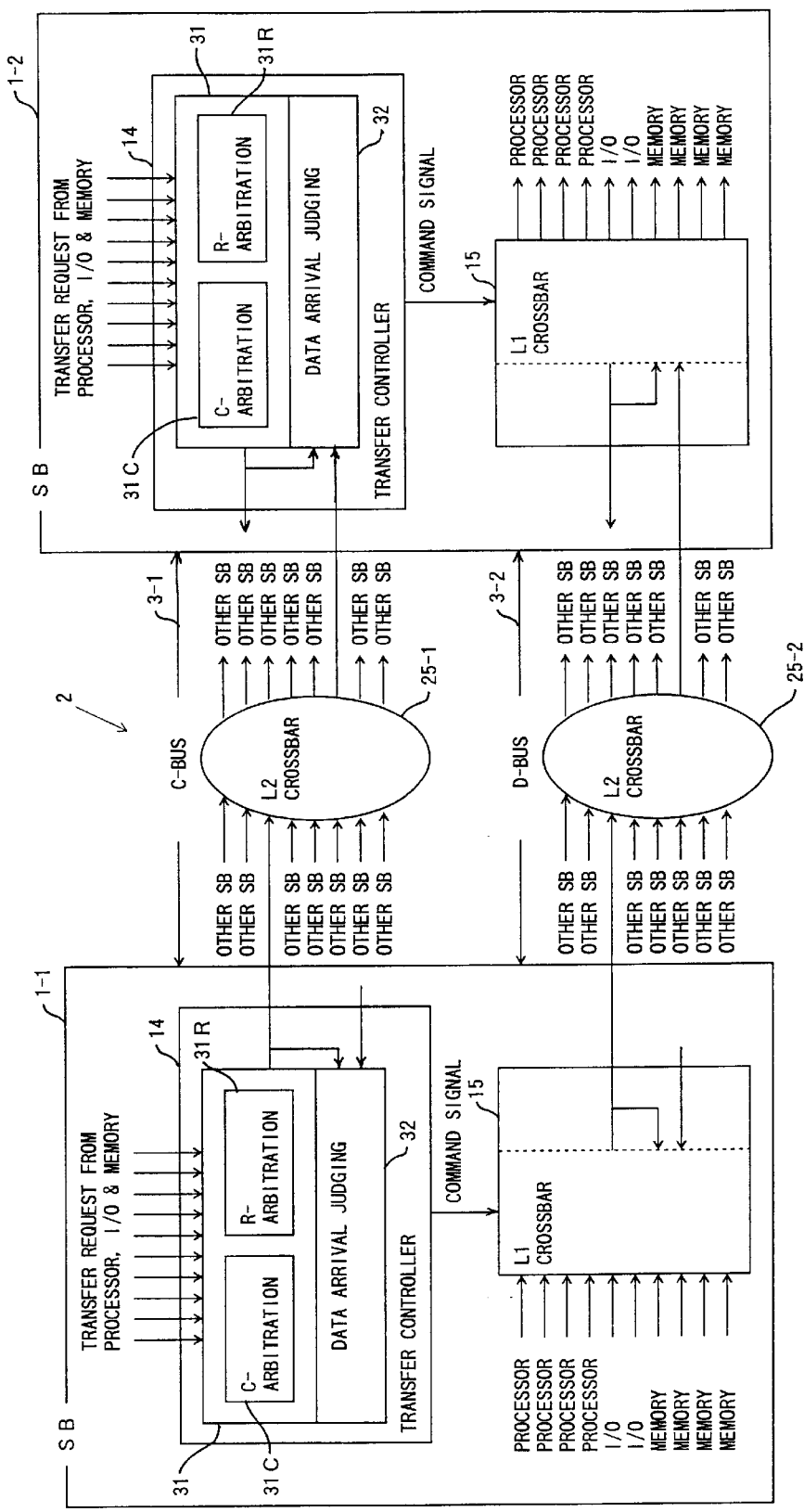
FIG. 4 is a system block diagram showing the construction of an important part of the first embodiment.

FIG. 4 is a system block diagram showing an important part of this embodiment. In FIG. 4, those parts which are the same as those corresponding parts in FIGS. 1 through 3 are designated by the same reference numerals, and a description thereof will be omitted. For the sake of convenience, FIG. 4 only shows the connection of the system modules 1-1 and 1-2 via the crossbar module 2.

An arbitration section 31 for making arbitration of the requests from the processors 11-1 through 11-M and a data arrival judging circuit 32 for judging the arrival of the transfer data are provided in the transfer controllers 14 of each of the system modules 1-1 and 1-2. The arbitration section 31 includes a C-arbitration circuit 31C and a R-arbitration circuit 31R. The arbitration section 31 and the L1 crossbar 15 are connected to the processors 11-1 through 11-M, the main memory 12, an input/output (I/O) port (not shown) and the like, and input the transfer requests such as the read request including the data. The data transfer is carried out by multiplexing the data and the control information.

The transfer controller 14 of the system module 1-1 is connected to the L2 crossbar 25-1 of the crossbar module 2 via the C-bus 3-1. The transfer controller 14 of the system module 1-2 is connected to the L2 crossbar 25-1 of the crossbar module 2 via the C-bus 3-1. In other words, the transfer controller 14 within each system module is connected via the C-bus 3-1 and the L2 crossbar 25-1 of the crossbar module 2 to the transfer controller 14 within the same or different system module.

On the other hand, the L1 crossbar 15 of the system module 1-1 is connected to the L2 crossbar 25-2 of the crossbar module 2 via the D-bus 3-2. The L1 crossbar 15 of the system module 1-2 is connected to the L2 crossbar 25-2 of the crossbar module 2 via the D-bus 3-2. In other words, the L1 crossbar 15 within each system module is connected via the D-bus 3-2 and the L2 crossbar 25-2 of the crossbar module 2 to the L1 crossbar 15 within the same or different system module.

Each of the C-bus 3-1 and the D-bus 32 can transmit and receive within the same system module 1-1 in a case where the transmission and reception of the data are made within the same system module 1-1, for example. In addition, in a case where the transmission and reception of the data are made between different system modules 1-1 and 1-2, for example, each of the C-bus 3-1 and the D-bus 3-2 transfers the data between the system module 1-1 at the transmitting end and the system module 1-2 at the receiving end, for example. The control information is transferred on the C-bus 3-1 in predetermined units, that is, in the form of control information packets (hereinafter simply referred to as C-packets). In addition, the data is transferred on the D-bus 3-2 in predetermined units, that is, in the form of data packets (hereinafter simply referred to as D-packets).

In each of the system modules 1-1 and 1-2, the transfer controller 14 outputs a command signal to the L1 crossbar 15 based on the transfer request. This command signal controls the data input/output timing and the like of the L1 crossbar 15. When the preparations for the data transmission are completed in the system module at the transmitting end, the transfer controller 14 in the system module at the transmitting end transmits one C-packet including a head which indicates a destination of the packet, and at the same time, outputs a data input command and D-packet header information to the L1 crossbar 15 as the command signal. Thereafter, the L1 crossbar 15 generates and outputs one D-packet corresponding to the one C-packet described above from the input data and the header information of the command signal. Accordingly, timewise, the one C-packet which is output from the transfer controller 14 in the system module at the transmitting end to the C-bus 3-1, leads the corresponding one D-packet which is output from the L1 crossbar 15 in the same system module to the D-bus 3-2.

Therefore, the transfer controller 14 within the system module at the transmitting end can output the C-packet a predetermined number of cycles before the D-packet is output from the L1 crossbar 15 within the same system module. For this reason, in the system module at the receiving end, the transfer controller 14 can generate the command signal for controlling the L1 crossbar 15 within the same system module before the D-packet arrives to the L1 crossbar 15. In addition, after the D-packet arrives to the system module at the receiving end, it is possible to immediately output the data from the L1 crossbar 15 to a target within the system module, such as the CPU, the I/O port and the memory.

In the case of a transfer not accompanied by a data transfer, this embodiment can make a notification without interfering with the transfer accompanied by the data transfer. The transfer not accompanied by the data transfer will hereinafter be referred to as a reply-only transfer. The reply-only transfer includes a data error notification, an invalidation complete notification, a data output enable notification and the like. The reply-only transfer is made using only the C-bus 3-1. The data error notification is made to notify that an error is generated in the data. The invalidation complete notification is made to notify that a data invalidation within the cache memory of the processor is completed. The data output enable notification is made as a measure of correcting the concentration of data.

In this embodiment, it is noted that the number of occupied (or consumed) cycles of the C-bus 3-1 in general is small compared to the number of occupied (or consumed) cycles of the D-bus 3-2. For example, in a case where one C-packet is transferred on the C-bus 3-1 in two cycles and one D-packet is transferred on the D-bus 3-2 in five cycles, a vacancy amounting to three cycles is generated on the C-bus 3-1. Hence, in this case, the three vacant cycles on the C-bus 3-1 are used to make the reply-only transfer which is not accompanied by the D-packet. In other words, in the case of the transfer accompanied by the data transfer, the C-packet is transferred on the C-bus 3-1 and the D-packet is transferred on the D-bus 3-2. On the other hand, in the case of the transfer not accompanied by the data transfer, the reply-only packet (hereinafter simply referred to as a R-packet) is transferred on the C-bus 3-1.

FIG. 5 is a diagram showing the bit structure of the C-packet. In FIG. 5, 1τ and 2τ respectively indicate the first and second cycles of the C-packet. A node ID indicates a group made up of a plurality of system modules when the system modules are grouped, and a slot ID indicates each system module within the group. A buffer type indicates the buffer structure within the L1 crossbar 15, and a port ID indicates the I/O port. A reply type-1 indicates the invalidation complete notification, and a reply type-2 indicates the data error notification or the data output enable notification. A master SB indicates the system module at the request source which issued the transfer request. In addition, data transfer quantities #1 and #2 indicate the data size of the C-packet. When the data transfer quantities #1 and #2 are both "1", for example, it is indicated that the data size of the C-packet is 64 bytes. Accordingly, when the data transfer quantities #1 and #2 are both "0", it is indicated that the data transfer quantity field is 0 byte, meaning that the reply-only transfer is made in this case, that is, the R-packet is transferred.

FIG. 6 is a diagram showing the C-packet and the R-packet transferred on the C-bus 3-1 and the D-packet transferred on the D-bus 3-2. In FIG. 6, the abscissa indicates the time. With respect to the C-packet (CC) amounting to two cycles (2τ), the corresponding D-packet (DDDDD) amounting to five cycles (5τ) is transferred after a delay of four cycles (4τ) from the start of the C-packet. On the other hand, with respect to the R-packet (RR) amounting to two cycles (2τ), no corresponding D-packet exists, and no D-packet is transferred.

Figure 7:
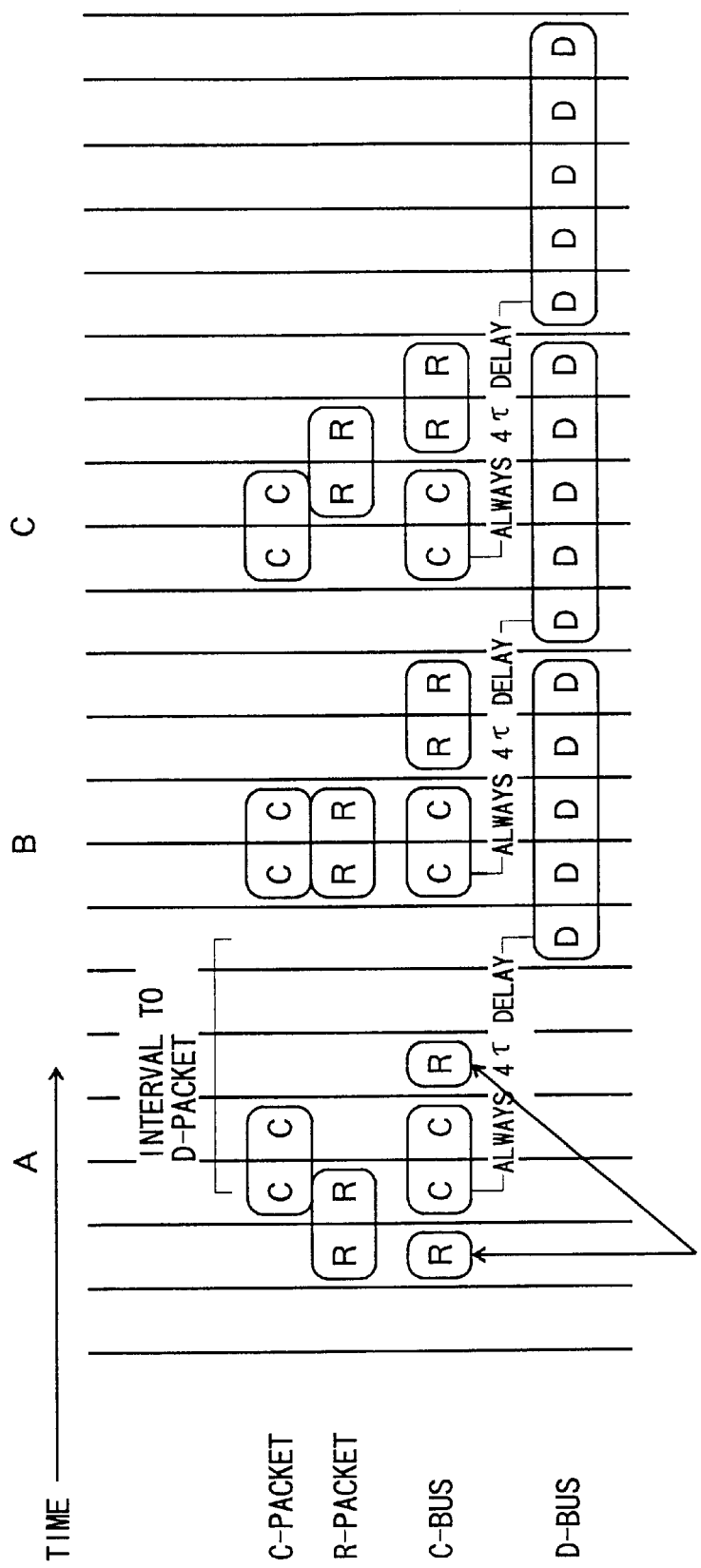
FIG. 7 is a diagram for explaining the priority order of the packets.

FIG. 7 is a diagram for explaining the priority order of the packets. In FIG. 7, those parts which are the same as those corresponding parts in FIG. 6 are designated by the same reference numerals, and a description thereof will be omitted. In this embodiment, of the packets which are transferred on the C-bus 3-1, the output priority order of the C-packet of the transfer accompanied by the data transfer is set higher than the output priority order of the R-packet of the reply-only transfer not accompanied by the data transfer.

Accordingly, in a case indicated by A in

FIG. 7, although the R-packet is generated before the C-packet, the output of the R-packet is discontinued at the time when the C-packet is generated, so as to give priority to the output of the C-packet. After the output of the C-packet ends, the remaining portion of the R-packet is output.

In a case indicated by B in FIG. 7, the R-packet and the C-packet are generated simultaneously. In this case, the priority is given to the output of the C-packet, and the R-packet is output after the output of the C-packet ends.

Furthermore, in a case indicated by C in FIG. 7, the C-packet is generated before the R-packet. In this case, the R-packet is not output at the time when the R-packet is generated, and the priority is given to the output of the C-packet. The R-packet is output after the output of the C-packet ends.

In each of the cases A, B and C described above, the transfer interval of one C-packet on the C-bus 3-1 is equal to the transfer interval of the D-packet on the D-bus 3-2, that is, five cycles (5τ). Hence, with respect to the transfer accompanied by the data transfer, the transfer on the C-bus 3-1 constantly leads the transfer on the D-bus 3-2 by a predetermined number of cycles, and this relationship is maintained constant regardless of the timings at which the C-packet and the R-packet are generated.

Figure 8:
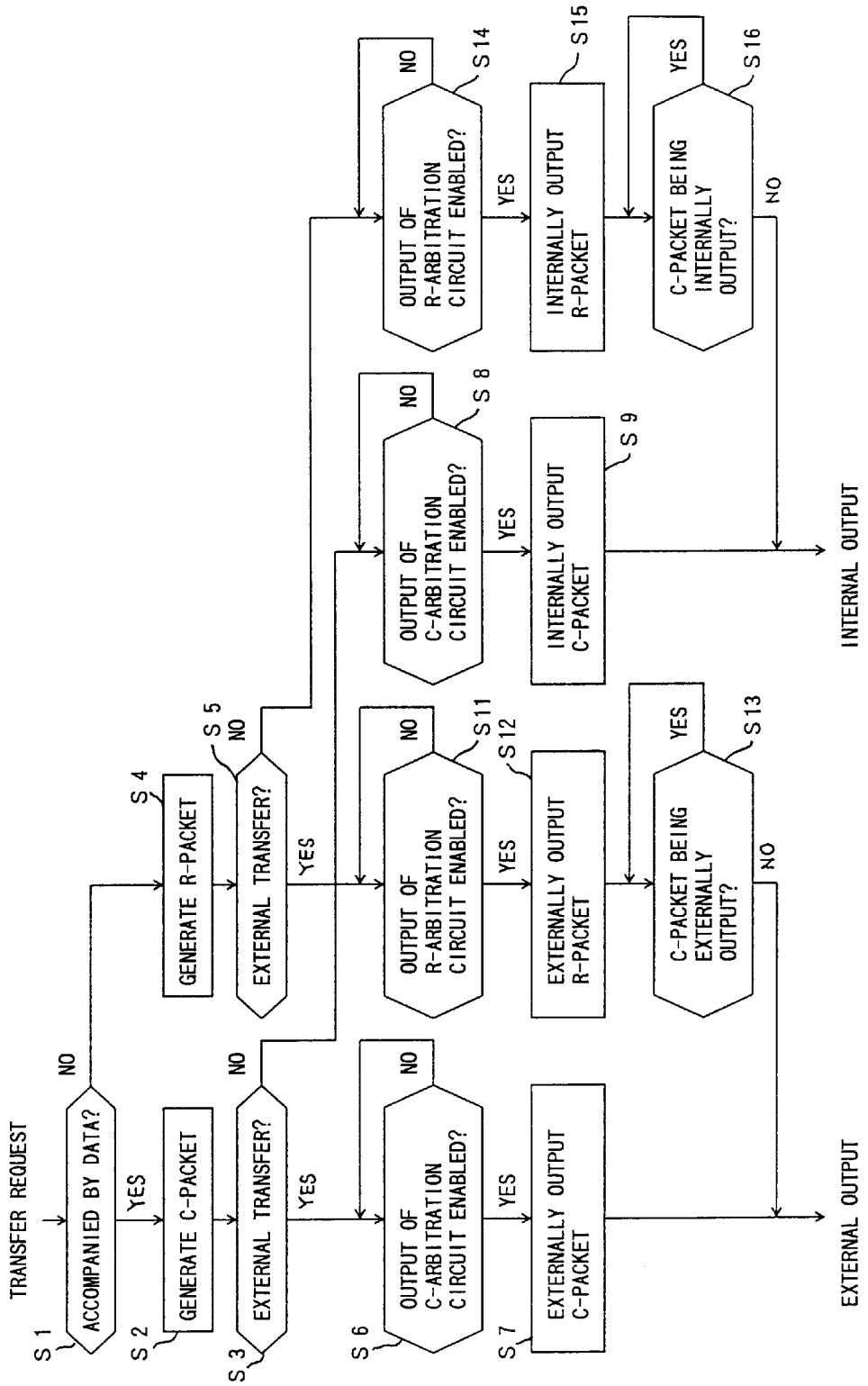
FIG. 8 is a flow chart for explaining the operation of an arbitration section of the first embodiment.

FIG. 8 is a flow chart for explaining the operation of the arbitration section 31 of the first embodiment. The process shown in FIG. 8 corresponds to the operation related particularly to the C-arbitration circuit 31C and the R-arbitration circuit 31R within the arbitration section 31.

In FIG. 8, when the transfer request is generated, an operation S1 decides whether or not the transfer request is accompanied by the data transfer. If the decision result in the operation S1 is YES, an operation S2 generates the C-packet, and the operation S3 decides whether or not the data transfer is a transfer to an external system module. On the other hand, if the decision result in the operation S1 is NO, an operation S4 generates the R-packet, and an operation S5 decides whether or not the data transfer is a transfer to an external system module.

If the decision result in the operation S3 is YES, an operation S6 decides whether or not the output of the C-packet to the external system module is enabled in the C-arbitration circuit 31C. If the decision result in the operation S6 is YES, an operation S7 outputs the C-packet with respect to the external system module, and the transfer process is continued in the external system module. On the other hand, if the decision result in the operation S3 is NO, an operation S8 decides whether or not the output of the C-packet within the system module is enabled in the C-arbitration circuit 31C. If the decision result in the operation S8 is YES, an operation S9 outputs the C-packet within the system module, and the transfer process is continued within the system module.

If the decision result in the operation S5 is YES, an operation S11 decides whether or not the output of the R-packet with respect to the external system module is enabled in the R-arbitration circuit 31R, and the process advances to an operation S12 if the decision result in the operation S11 is YES. The operation S12 outputs the R-packet with respect to the external system module, and an operation S13 decides whether or not the C-packet is being output with respect to the external system module. If the decision result in the operation S13 is NO, the transfer process is continued in the external system module. On the other hand, if the decision result in the operation S5 is NO, an operation S14 decides whether or not the output of the R-packet within the system module is enabled in the R-arbitration circuit 31R, and the process advances to an operation S15 if the decision result in the operation S14 is YES. The operation S15 outputs the R-packet within the system module, and an operation S16 decides whether or not the C-packet is being output within the system module. If the decision result in the operation S16 is NO, the transfer process is continued within the system module.

Next, a description will be given of a second embodiment of the multiprocessor system according to the present invention. The basic construction of this second embodiment of the multiprocessor system is the same as the basic construction of the first embodiment of the multiprocessor system described above in conjunction with FIGS. 1 through 3.

Figure 9:
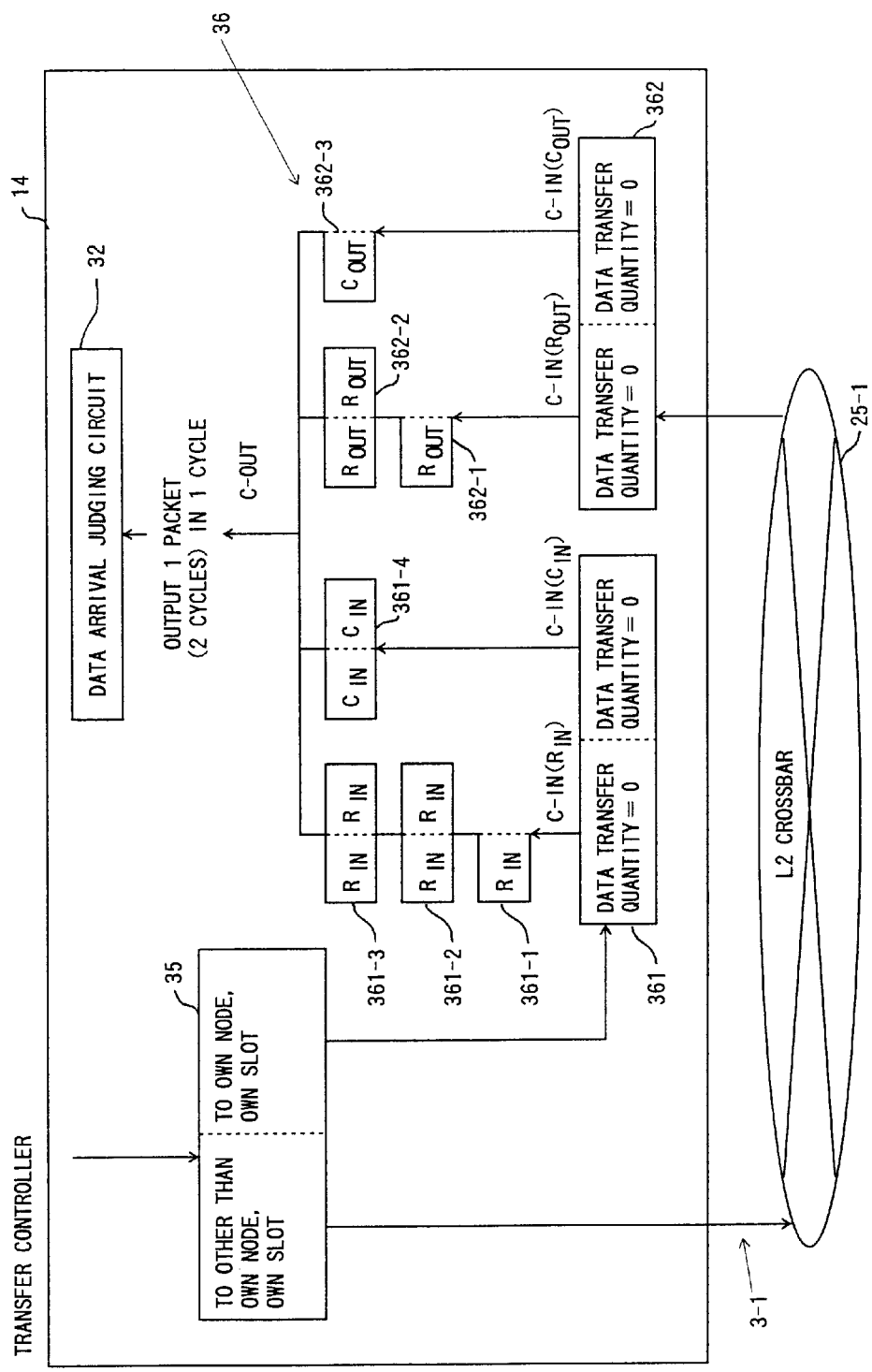
FIG. 9 is a system block diagram showing the construction of an important part of a second embodiment of the multiprocessor system according to the present invention.

FIG. 9 is a system block diagram showing the construction of an important part of the second embodiment of the multiprocessor system. In FIG. 9, those parts which are the same as those corresponding parts in FIGS. 1 through 4 are designated by the same reference numerals, and a description thereof will be omitted. This second embodiment of the multiprocessor system employs a second embodiment of the data transfer method according to the present invention. This embodiment is particularly characterized by the data transfer within the system module after the above described notification of the address and the notification of the cache information are made, that is, after preparations for the data transfer are completed.

The transfer controller 14 within the system module shown in FIG. 9 includes in addition to the arbitration section 31 and the data arrival judging circuit 32 which are omitted and not shown, a destination judging section 35 and a data buffer section 36. The destination judging section 35 judges whether the destination of the C-packet which is to be transferred is within the system module or in an external system module. More particularly, the destination judging section 35 judges the destination of the C-packet by checking the node ID and the slot ID within the C-packet shown in FIG. 5. The C-packet which is to be transferred within the system module is supplied to the data buffer section 36. On the other hand, the C-packet which is to be transferred to the external system module is supplied to the L2 crossbar 25-1 within the crossbar module 2 via the C-bus 3-1. In other words, the C-packet which is to be transferred within the system module is transferred within the transfer controller 14 without passing the L2 crossbar 25-1.

The data buffer section 36 includes buffers 361 and 361-1 through 361-4 for buffering the C-packet which is transferred within the system module, and buffers 362 and 362-1 through 362-3 for buffering the C-packet from the external system module and input via the L2 crossbar 25-1.

The buffer 361 judges whether the incoming packet within the system module is the C-packet or the R-packet based on the data transfer quantity of the C-packet. The buffers 361-1 through 361-3 holds the R-packet $R_{IN}$, and the buffer 361-4 holds the C-packet $C_{IN}$, where $R_{IN}$ indicates the R-packet which is transferred within the same system module, and $C_{IN}$ indicates the C-packet which is transferred within the same system module.

The buffer 362 judges whether the incoming packet from the external system module is the C-packet or the R-packet based on the data transfer quantity of the C-packet. The buffers 362-1 and 362-2 holds the R-packet $R_{OUT}$, and the buffer 362-3 holds the C-packet $C_{OUT}$, where $R_{OUT}$ indicates the R-packet which is transferred between different system modules, and $C_{OUT}$ indicates the C-packet which is transferred between different system modules.

The packets from the data buffer section 36 are output so that one packet (two cycles) is output to the data arrival judging circuit 32 in one cycle.

Therefore, the C-packet which is transferred within the system module is transferred within the transfer controller 14, without passing the L2 crossbar 25-1. For this reason, the distance of the physical path becomes shorter compared to the case where the L2 crossbar 25-1 is included in the physical path, thereby making it possible to achieve a high-speed transfer.

A packet flow rate PQ1 from the data buffer section 36 to the data arrival judging circuit 32 is greater than or equal to a sum of a packet flow rate PQ2 of the L2 crossbar 25-1 and a packet flow rate PQ3 within the transfer controller 14, that is, $PQ1 \geq PQ2+PQ3$. In addition, in this embodiment, fixed priority orders are set with respect to the transfer orders of the C-packet and the R-packet. The priority orders are set to satisfy $YC_{OUT}>YC_{IN}>YR_{OUT}>YR_{IN}$, where $YC_{OUT}$ indicates the priority order of the C-packet $C_{OUT}$ which is transferred between different system modules, $YC_{IN}$ indicates the priority order of the C-packet $C_{IN}$ which is transferred within the same system module, $YR_{OUT}$ indicates the priority order of the R-packet $R_{OUT}$ which is transferred between different system modules, and $YR_{IN}$ indicates the priority order of the R-packet $R_{IN}$ which is transferred within the same system module. The delay in the data buffer section 36, that is, the number of buffer stages with respect to each packet type, is determined based on the packet flow rate for each of the priority orders described above.

Therefore, according to this embodiment, no transfer limitation is imposed on the transfer within the system module and the transfer to the external system module, and it is possible to carry out a high-speed transfer particularly within the system module.

Next, a description will be given of the operation of the data buffer section 36 of this embodiment, by referring to FIGS. 10 through 13. In FIGS. 10 through 13, ① indicates a first cycle, ⓪ indicates a second cycle, ■ indicates a time period in which the output of the R-packet is stopped since the C-bus 3-1 is being used, and C-OUT indicates an output from the data buffer section 36.

Figure 10:
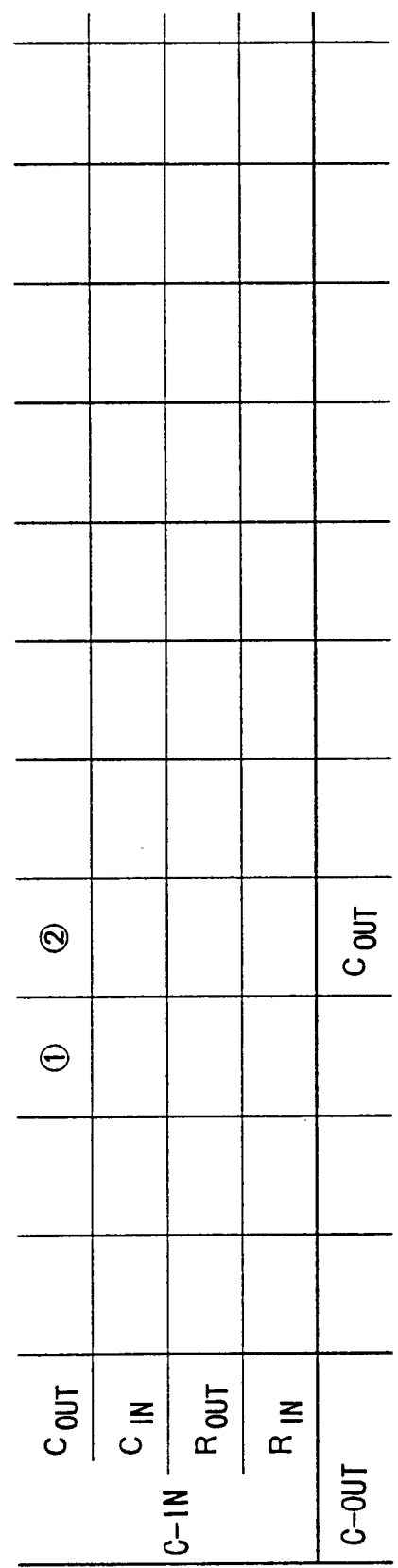
FIG. 10 is a diagram for explaining the operation of a data buffer section of the second embodiment.
Figure 11:
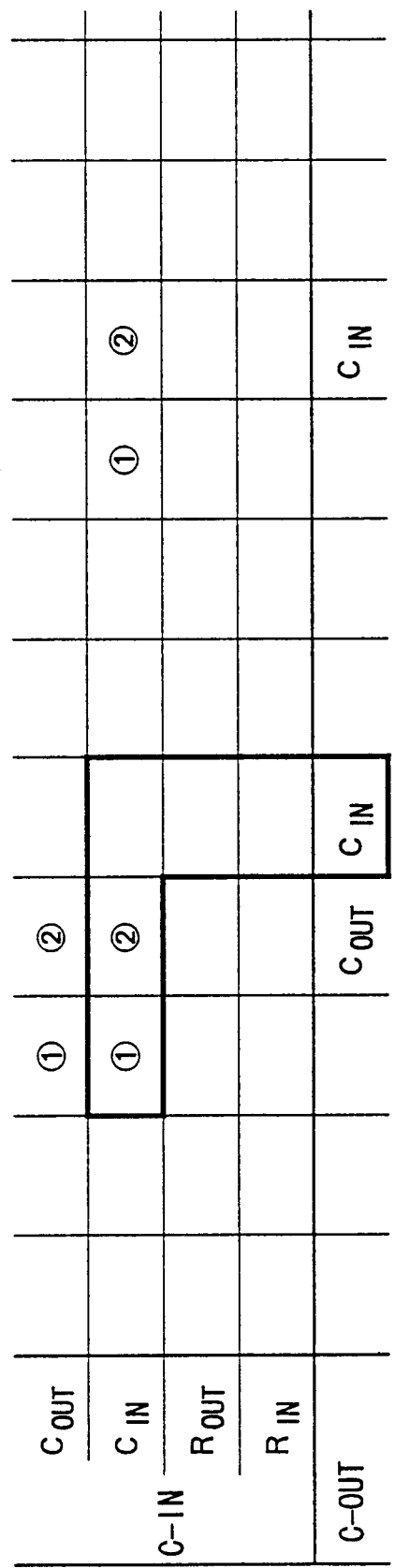
FIG. 11 is a diagram for explaining the operation of the data buffer section of the second embodiment.

In the case of the C-packet $C_{OUT}$ which is transferred to the external system module, the output of this C-packet $C_{OUT}$ is unaffected by other packets since the C-packet $C_{OUT}$ has the highest priority order. Hence, the first cycle of the C-packet $C_{OUT}$ is buffered in the buffer 362-3, and the second cycle of the C-packet $C_{OUT}$ is passed through and output. Consequently, with respect to the C-packet $C_{OUT}$, it may be seen that the number of required buffer stages is one which amounts to one cycle, as shown in FIG. 10.

In the case of the C-packet $C_{IN}$ which is transferred within the system module, the first cycle is buffered in the buffer 361-4, and is delayed by one cycle if a contention occurs between the output packet and the C-packet $C_{OUT}$. On the other hand, when outputting the C-packet $C_{IN}$, there is no next incoming C-packet $C_{IN}$. For this reason, with respect to the C-packet $C_{IN}$, the number of required buffer stages is one which amounts to two cycles, as may be seen from FIG. 11.

In the case of the R-packet $R_{OUT}$ which is transferred to the external system module, the R-packet $R_{OUT}$ may be delayed by two cycles within five cycles, since the transfer interval of the C-packet $C_{OUT}$ and the C-packet $C_{IN}$ is once in five cycles. In addition, while the R-packet $R_{OUT}$ is being output, the first cycle of the next R-packet $R_{OUT}$ is input. Accordingly, the R-packet $R_{OUT}$ is buffered in the buffers 362-1 and 362-2. In other words, with respect to the R-packet $R_{OUT}$, the number of required buffer stages is two which amounts to three cycles, as may be seen from FIG. 12.

In the case of the R-packet $R_{IN}$ which is transferred within the system module, the R-packet $R_{IN}$ may be delayed by two cycles in seven cycles, because the transfer interval of the C-packet $C_{OUT}$ and the C-packet $C_{IN}$ is once in five cycles. In this state, a maximum of two R-packets $R_{OUT}$ may be output within seven cycles, and thus, the R-packet $R_{IN}$ may be delayed by two cycles within seven cycles. Moreover, while the R-packet $R_{IN}$ is being output, the first cycle of the next R-packet $R_{IN}$ is input. Hence, the R-packet $R_{IN}$ is buffered in the buffers 361-1 through 361-3. In other words, with respect to the R-packet $R_{IN}$, the number of required buffer stages is three which amounts to five cycles, as may be seen from FIG. 13.

Figure 14:
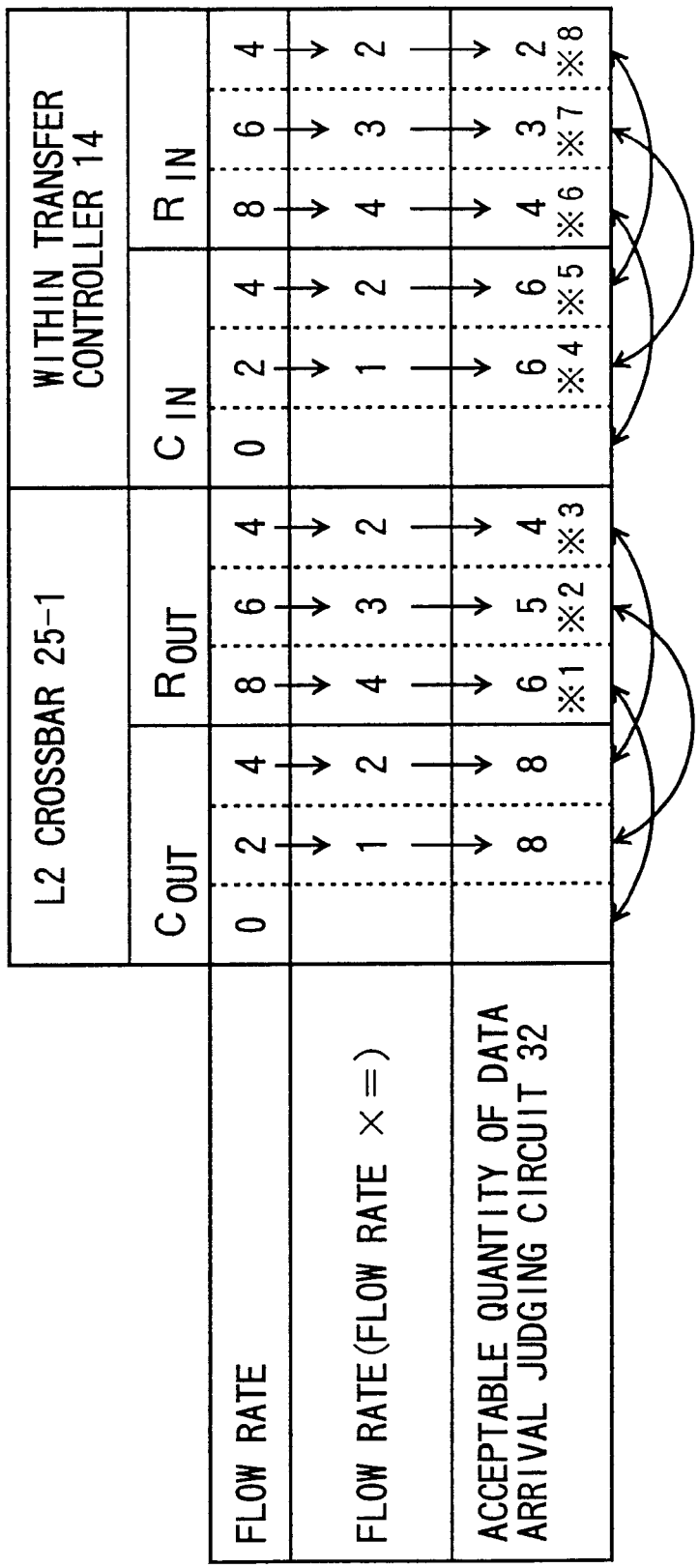
FIG. 14 is a diagram for explaining a maximum flow rate of the packets in eight cycles.

FIG. 14 is a diagram for explaining a maximum flow rate of the packets in eight cycles for the above described cases.

In FIG. 14, the unit of the numerical values is cycles, and the numerals indicated above ※1 through ※8 are obtained from the following.

Figure 15:
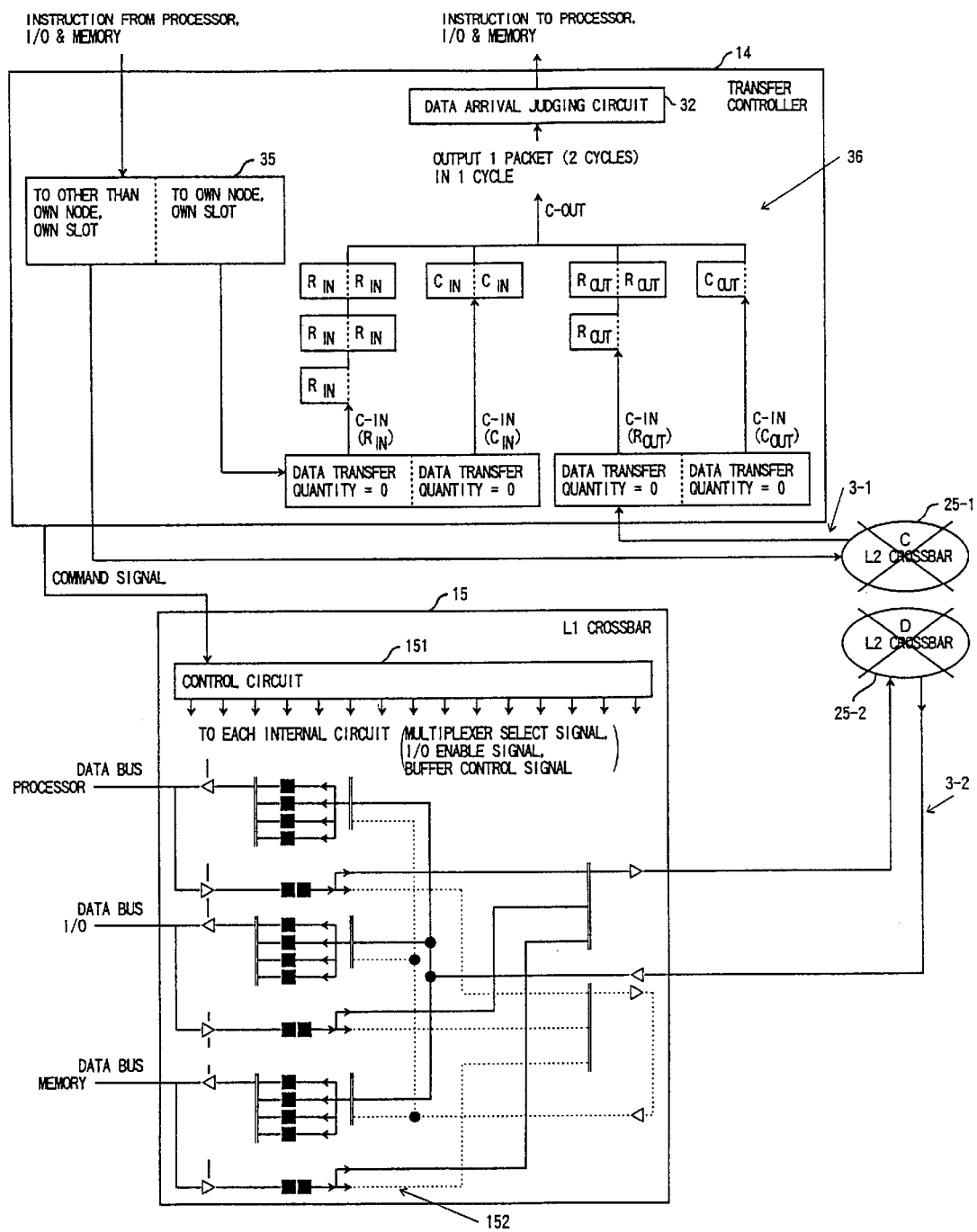
FIG. 15 is a system block diagram showing the construction of parts related to the transfer of the D-packet in the second embodiment.

※1: $8-C_{IN}\text{-OUT}\times 2=6$
※2: $8-C_{OUT}\text{-OUT}\times 1-C_{IN}\text{-OUT}\times 2=5$
※3: $8-C_{OUT}\text{-OUT}\times 2-C_{IN}\text{-OUT}\times 2=4$
※4: $8-C_{OUT}\text{-OUT}\times 2=6$
※5: $8-C_{OUT}\text{-OUT}\times 2=6$
※6: $8-C_{OUT}\text{-OUT}\times 2-R_{OUT}\text{-OUT}\times 2=4$
※7: $8-C_{OUT}\text{-OUT}\times 2-R_{OUT}\text{-OUT}\times 2-C_{IN}\text{-OUT}\times 1=3$
※8: $8-C_{OUT}\text{-OUT}\times 2-R_{OUT}\text{-OUT}\times 2-C_{IN}\text{-OUT}\times 2=2$ Next, a description will be given of the transfer of the D-packet in this second embodiment. FIG. 15 is a system block diagram showing the construction of parts related to the transfer of the D-packet in this second embodiment. In FIG. 15, those parts which are the same as those corresponding parts in FIGS. 1 through 4 and 9 are designated by the same reference numerals, and a description thereof will be omitted.

In FIG. 15, the L1 crossbar 15 includes a control circuit 151 and a buffer section 152. Based on the command signal from the transfer controller 13, the control circuit 151 generates multiplexer select signals, I/O enable signals and buffer control signals which are to be supplied to the buffer section 152. The buffer section 152 includes multiplexers and buffers which are connected as shown in FIG. 15, with respect to each of the processors, I/O ports and memories within the same system module. For the sake of convenience, FIG. 15 indicates the multiplexer by double vertical lines, and indicates the buffer by ■. The multiplexers at the output stage within the L1 crossbar 15 are connected to the L2 crossbar 25-2 via the D-bus 3-2.

In this embodiment, when the D-packet is transferred within the system module, the D-packet is not output from the L1 crossbar 15 to the L2 crossbar 25-2, but is transferred within the L1 crossbar 15. More particularly, when the D-packet is transferred within the system module, the control circuit 151 generates and supplies to the buffer section 12 the multiplexer select signals, the I/O enable signals and the buffer control signals for transferring the D-packet within the L1 crossbar 15, based on the command signal from the transfer controller 14.

Figure 16:
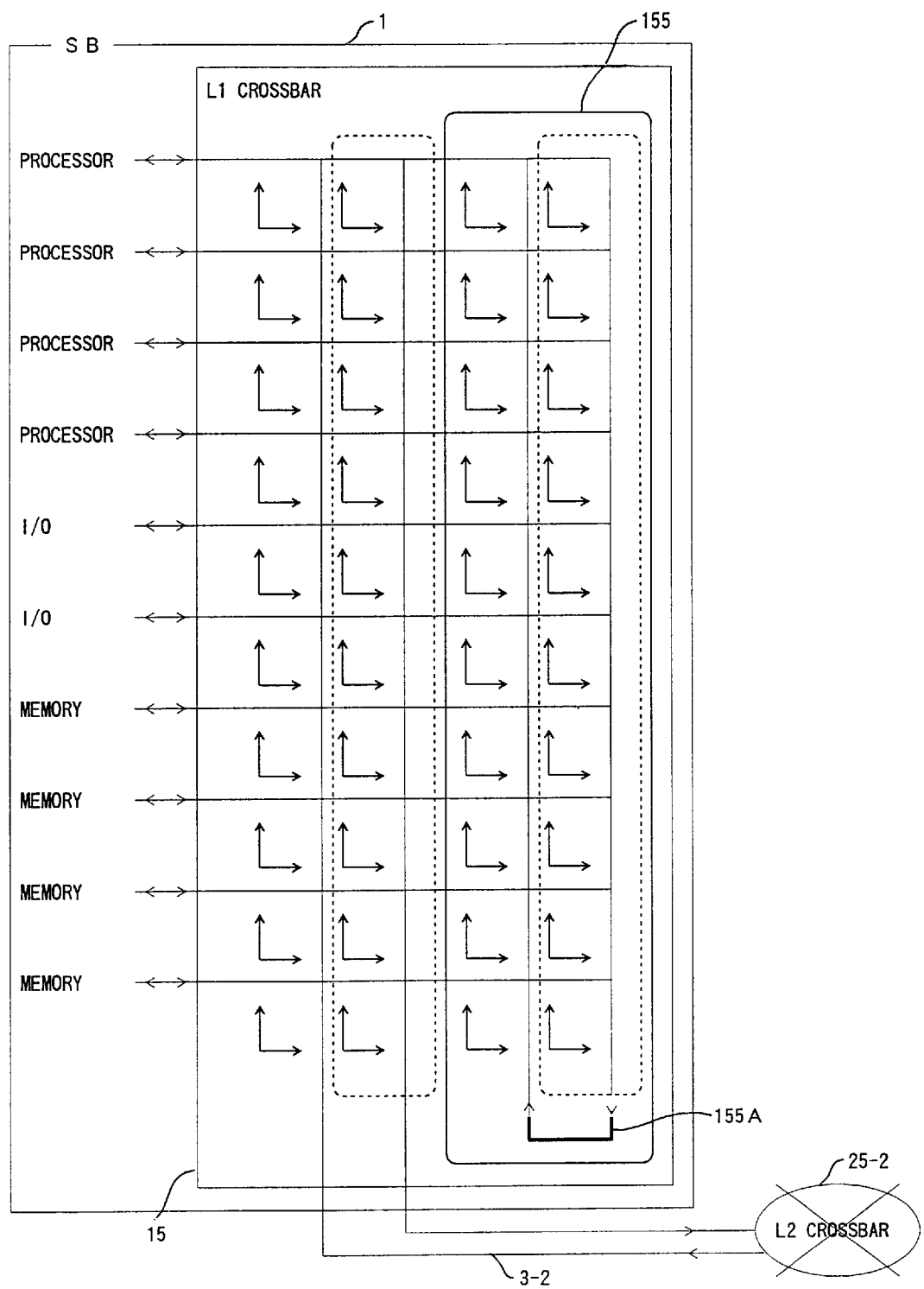
FIG. 16 is a diagram showing the construction of a L1 crossbar of the second embodiment.
Figure 17:
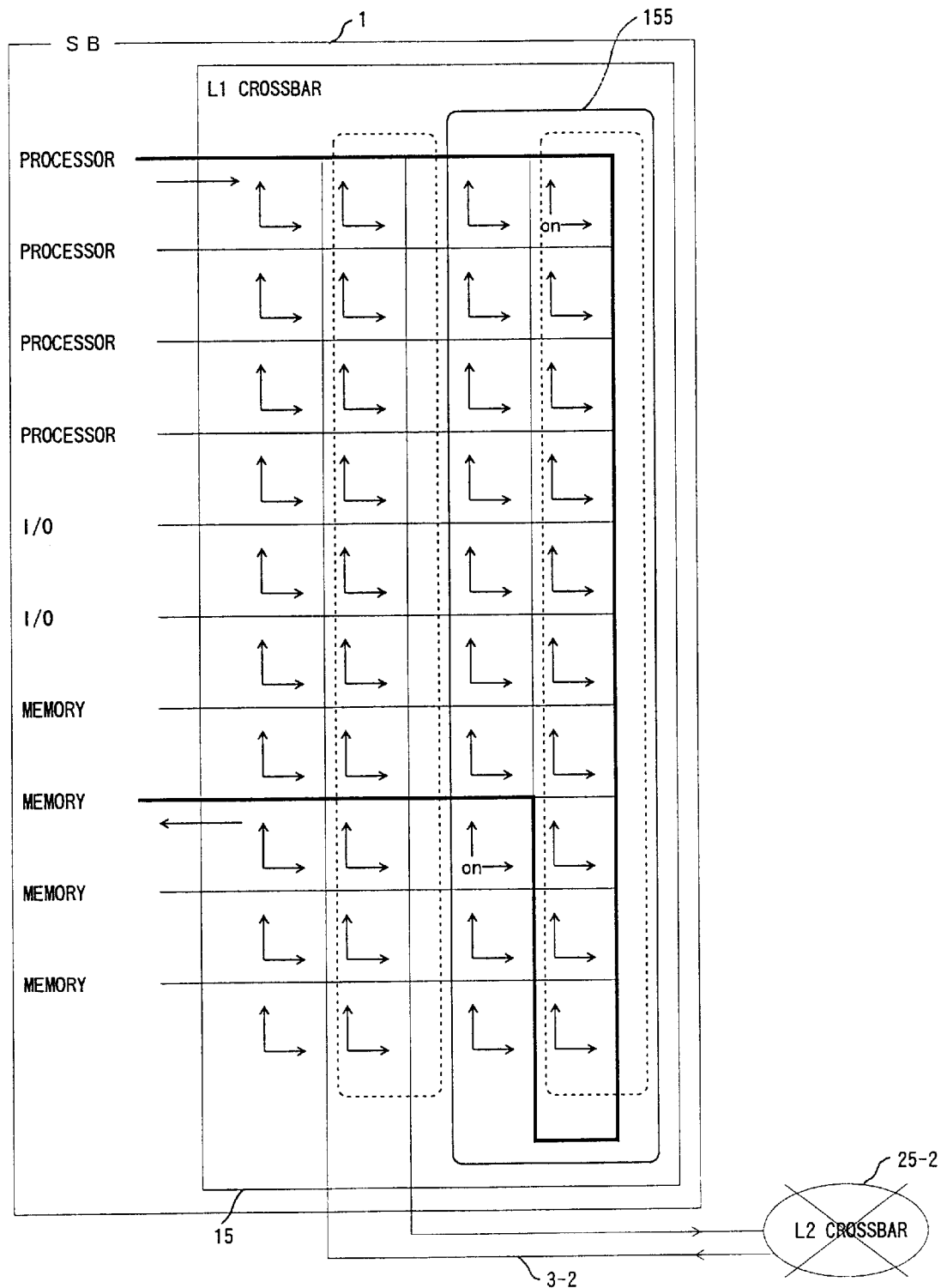
FIG. 17 is a diagram for explaining the transfer of the D-packet within the system module.

FIG. 16 is a diagram showing the construction of the L1 crossbar 15 of this second embodiment, and FIG. 17 is a diagram for explaining the transfer of the D-packet within the system module. In FIGS. 16 and 17, the L1 crossbar 15 is illustrated as a group of switches arranged in an array, so as to facilitate the understanding of the functions of the L1 crossbar 15 within the system module 1.

Accordingly, the L1 crossbar 15 is illustrated in FIGS. 16 and 17 as if the signals from the control circuit 151 control the ON/OFF state of each of the switches in the switch group. When transferring the D-packet within the same system module 1, the switch group is controlled so that the D-packet passes a return part 155 indicated by a bold line in FIG. 16 within the L1 crossbar 15. A return path 155A is provided in the return part 155. As a result, the D-packet from a certain processor within the system module 1 passes the return part 155 within the L1 crossbar 15 and is transferred to a corresponding memory within the system module 1, without passing the L2 crossbar 25-2, as indicated by a bold arrow in FIG. 17. In FIG. 17, the switches which are turned ON are labeled "on".

Therefore, the packet which is transferred within one system module in this embodiment, is transferred at a high speed within the system module without passing the L2 crossbar 25-1 or 25-2, regardless of the packet type such as the C-packet and the D-packet.

Further, the present invention is not limited to these embodiments, but various variations and modifications may be made without departing from the scope of the present invention.

What is claimed is:

1. A multiprocessor system comprising: a plurality of system modules each having a plurality of processors, a transfer controller and a first crossbar:

a crossbar module including a second crossbar;

a control bus coupling the transfer controller of each of said system modules to said crossbar module; and a data bus coupling the first crossbar of each of said system modules to said crossbar module, wherein, within an arbitrary one of said system modules, the first crossbar outputs a data packet to said data bus in response to a command signal from the transfer controller after the transfer controller outputs a control information packet to said control bus, said transfer controller outputs to said control bus a reply-only packet, which is unaccompanied by a data transfer and is used to notify a reply-only transfer, and outputs the control information packet at a time when the control information packet is generated with priority over other packets regardless of a generating order of the control information packet and the reply-only packet, and thereafter outputs the reply-only packet which is not yet output if any, and a time period from a time when the output of the control information packet starts to a time when the first crossbar starts to output a corresponding data packet is constant.

2. A data transfer method for a multiprocessor system in which a plurality of system modules each including a plurality of processors, a transfer controller and a first crossbar are coupled to a crossbar module including a second crossbar, via a control bus and a data bus, said data transfer method comprising:

within an arbitrary one of the system modules, outputting a data packet to the data bus from the first crossbar in response to a command signal from the transfer controller after the transfer controller outputs a control information packet to the control bus;

outputting, from the transfer controller to the control bus, a reply-only packet which is unaccompanied by a data transfer and is used to notify a reply-only transfer; and outputting, from the transfer controller, the control information packet at a time when the control information packet is generated with priority over other packets regardless of a generating order of the control information packet and the reply-only packet, and thereafter outputting, from the transfer controller, the reply-only packet which is not yet output if any, wherein a time period from a time when the output of the control information packet starts to a time when the first crossbar starts to output a corresponding data packet is constant.

3. A multiprocessor system comprising:

a plurality of system modules each including a plurality of processors, a transfer controller and a first crossbar; and a crossbar module including a second crossbar which couples said plurality of system modules, wherein, when making a transfer within an arbitrary one of said plurality of system modules, the transfer controller transfers a control information packet therewithin without passing the second crossbar, said transfer controller transfers a reply-only packet, which is unaccompanied by a data transfer and is used to notify a reply only transfer, and said transfer controller buffers packets by setting priority orders to satisfy $YR_{OUT} > YC_{IN} > YR_{OUT} > YR_{IN}$, where $YR_{OUT}$ indicates a priority order of a control information packet which is transferred from one of said plurality of system modules other than said arbitrary system module, $YC_{IN}$ indicates a priority order of a control information packet which is transferred within said arbitrary system module, $YR_{OUT}$ indicates a priority order of a reply-only packet which is transferred from one of said plurality of system modules other than said arbitrary system module, and $YR_{IN}$ indicates a priority order of a reply-only packet which is transferred within said arbitrary system module.

4. The multiprocessor system as claimed in claim 3, wherein the first crossbar includes a return part which transfers a data packet therewithin without passing the second crossbar when making a transfer within said arbitrary system module.

* * * * *